(12) United States Patent
Hutchinson

(10) Patent No.: US 10,196,180 B2
(45) Date of Patent: Feb. 5, 2019

(54) RECEPTACLE

(71) Applicant: MEDWAY PLASTICS CORPORATION, Long Beach, CA (US)

(72) Inventor: Gerald A. Hutchinson, Huntington Beach, CA (US)

(73) Assignee: Medway Plastics Corporation, Long Beach, CA (US)

( * ) Notice: Subject to any disclaimer, the term of this patent is extended or adjusted under 35 U.S.C. 154(b) by 0 days.

(21) Appl. No.: 15/817,055

(22) Filed: Nov. 17, 2017

(65) Prior Publication Data

US 2018/0072468 A1     Mar. 15, 2018

Related U.S. Application Data

(63) Continuation-in-part of application No. 15/099,553, filed on Apr. 14, 2016.

(60) Provisional application No. 62/147,521, filed on Apr. 14, 2015.

(51) Int. Cl.
| | |
|---|---|
| *B65D 25/20* | (2006.01) |
| *B65D 43/02* | (2006.01) |
| *B65D 21/02* | (2006.01) |
| *A47C 13/00* | (2006.01) |
| *A47C 9/00* | (2006.01) |
| *B65D 25/38* | (2006.01) |
| *B65D 1/16* | (2006.01) |
| *A47J 47/02* | (2006.01) |

(52) U.S. Cl.
CPC ............ *B65D 43/0204* (2013.01); *A47C 9/00* (2013.01); *A47C 13/005* (2013.01); *B65D 1/16* (2013.01); *B65D 21/0233* (2013.01); *B65D 25/205* (2013.01); *B65D 25/38* (2013.01); *A47J 47/02* (2013.01)

(58) Field of Classification Search
CPC .. B65D 25/20; B65D 25/205; B65D 2313/04; A47G 19/2227
USPC ......................................... 220/212, 608, 527
See application file for complete search history.

(56) References Cited

U.S. PATENT DOCUMENTS

| | | | | |
|---|---|---|---|---|
| 2013/0139700 A1* | 6/2013 | Fabozzi | .............. | B29C 45/0046 99/295 |
| 2014/0158699 A1* | 6/2014 | Kim | ................... | A47G 19/2272 220/592.17 |
| 2014/0227485 A1* | 8/2014 | Gao | .................... | B29C 47/0023 428/151 |
| 2015/0021322 A1* | 1/2015 | Rosenblum | ........ | B65D 21/0223 220/23.89 |
| 2015/0251807 A1* | 9/2015 | Rosenblum | ........ | B65D 21/0223 220/527 |

* cited by examiner

*Primary Examiner* — King M Chu
(74) *Attorney, Agent, or Firm* — Knobbe, Martens, Olson & Bear, LLP

(57) ABSTRACT

The receptacle including stacking lugs to help reduce vacuum and friction when de-nesting the receptacles. The receptacle including a lid that helps when storing certain types of goods and/or serves as a seat. A septum or receptacle molded into the lid to allow for injection of inert gases or flushing headspace.

18 Claims, 25 Drawing Sheets

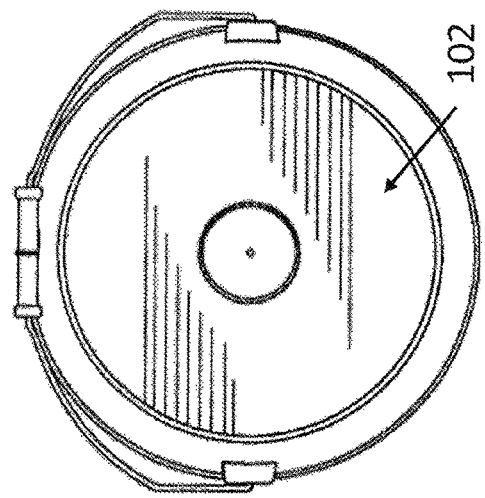
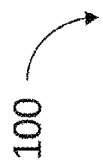
FIG. 8

RECEPTACLE

CROSS REFERENCE TO RELATED APPLICATION

This application claims the benefit of U.S. patent application Ser. No. 15/099,553, filed Apr. 14, 2016, which claims priority to U.S. Provisional Patent Application No. 62/147,521, filed on Apr. 14, 2015, which are hereby incorporated by reference in their entirety for all purposes.

BACKGROUND

Technical Field

The current subject matter is directed to receptacles, such as buckets.

Description of the Related Art

Buckets have become a popular medium of transporting goods.

SUMMARY

Nested buckets often times create a vacuum or friction in between the buckets that make separating the nested buckets difficult. This makes nesting and de-nesting more cumbersome, requiring more effort and time, and may even limit the number of buckets one could nest because of the difficulty of de-nesting buckets at a high height. Therefore, it is important to identify ways to reduce the vacuum or friction.

Furthermore, one of the challenges to transporting certain goods in buckets is the lack of proper environments for storing and transporting these goods for lengths of time. For example, certain types of goods perish much faster if certain types of gasses coincide with the goods or if the headspace has not been flushed. Therefore, there is a need for a bucket that provides such an environment.

Some embodiments of the present disclosure provide a bucket including a lid. The lid may help store certain types of goods. A septum or receptacle may be molded into the lid to allow for injection of inert gases or flushing headspace. Additionally, the bucket may have sufficient strength so that the lid may serve as a seat for sitting.

BRIEF DESCRIPTION OF THE DRAWINGS

FIG. 8 is a bottom view of the bucket according to some embodiments;

DETAILED DESCRIPTION OF THE PREFERRED EMBODIMENT

It should be understood that the present disclosure generally relates to a bucket. The bucket can be a bucket of standard size, such as a 5 gallon bucket that is 11.91" dia.×14.50" high×10.33" dia with a wall thickness of 0.075"+/−0.005", where the diameter is different at the top and bottom of the bucket creating a draw. The wall thickness may also be different, ranging from 30 to 50 mils. The bucket may also be a 5 gallon bucket that is 14.5" in height and 13" in width, and the inside of the bucket is 13" in depth and 12" in diameter. However, any sized bucket, standard or non-standard sized, is appreciated. Furthermore, any structure (for example, a container, crate, bottle) that may provide for storage and receipt of a fluid, solid, or other material which a user wishes to store or transport has been contemplated. The present disclosure is in no way limited to the embodiment disclosed herein. However, for ease of understanding and to provide at least one preferred exemplary embodiment, a bucket system is described. Furthermore, although the embodiments disclose storing liquids in the bucket, it is understood that the present disclosure is not limited to the storage of liquids but may be utilized with any material to be stored.

Figure 1:
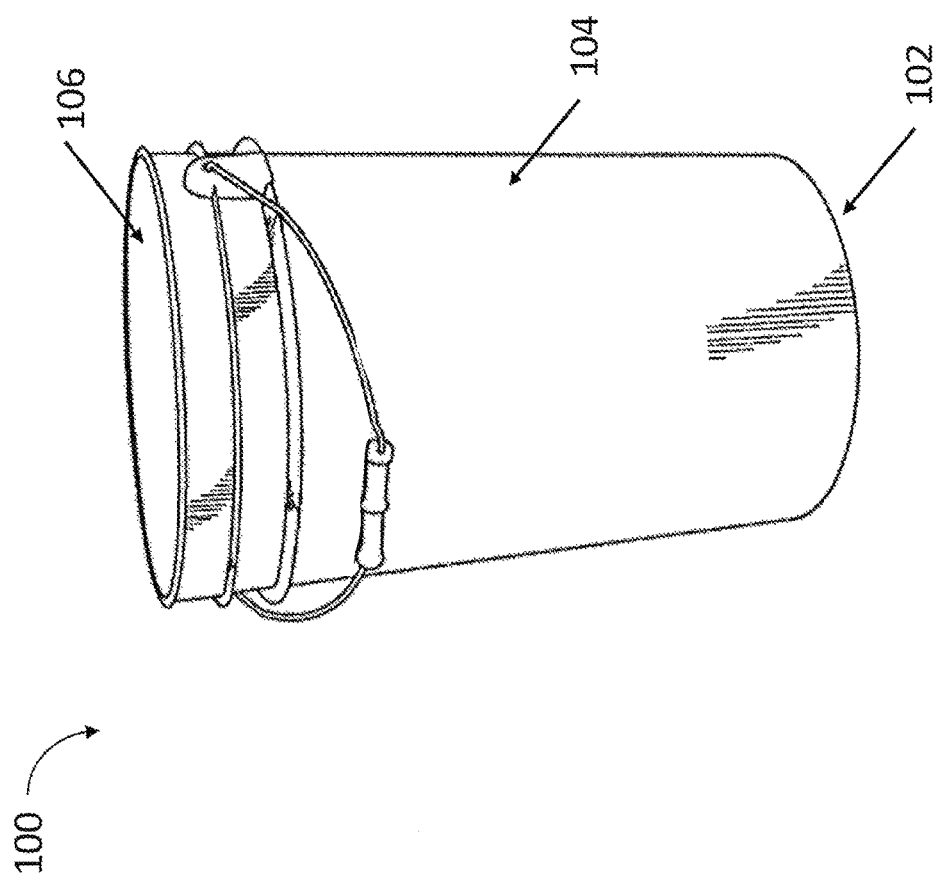
FIG. 1 is a first front perspective view of a bucket according to some embodiments.
Figure 2:
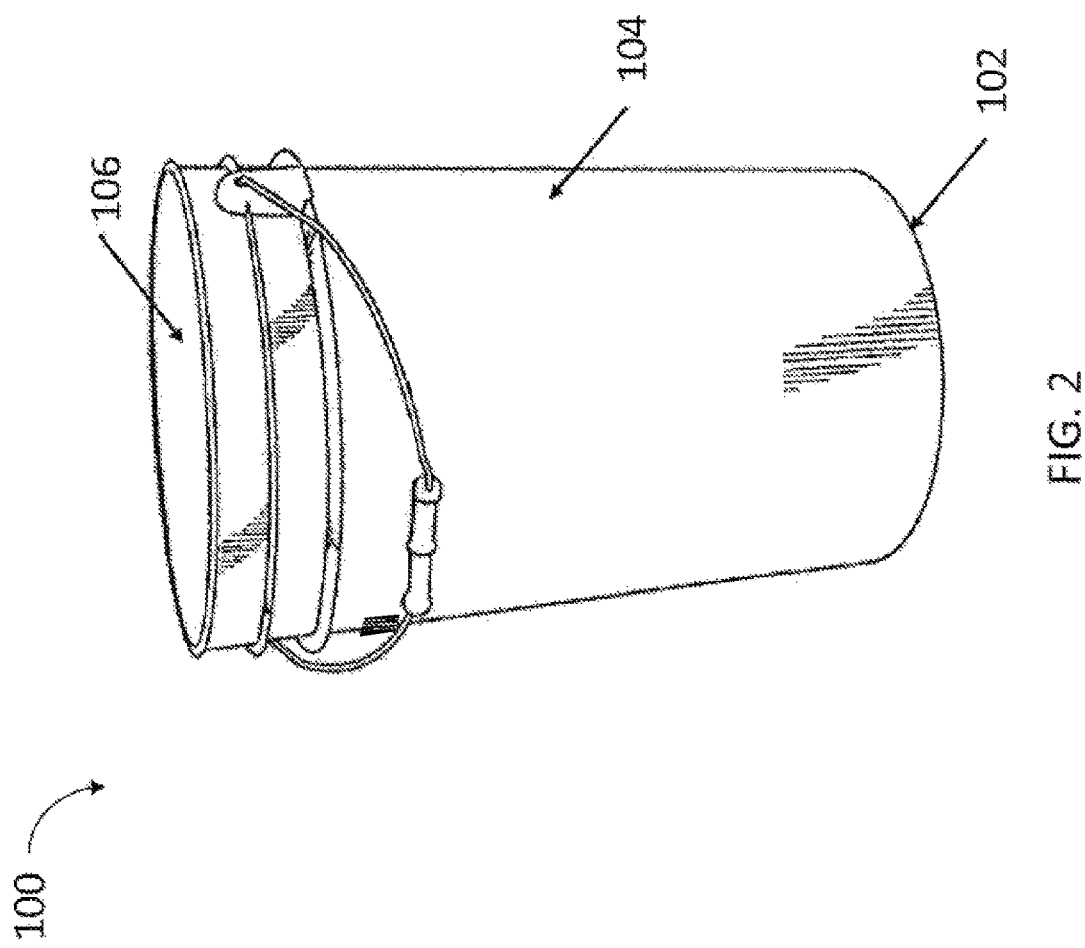
FIG. 2 is a forth front perspective view of a bucket according to some embodiments.
Figure 3:
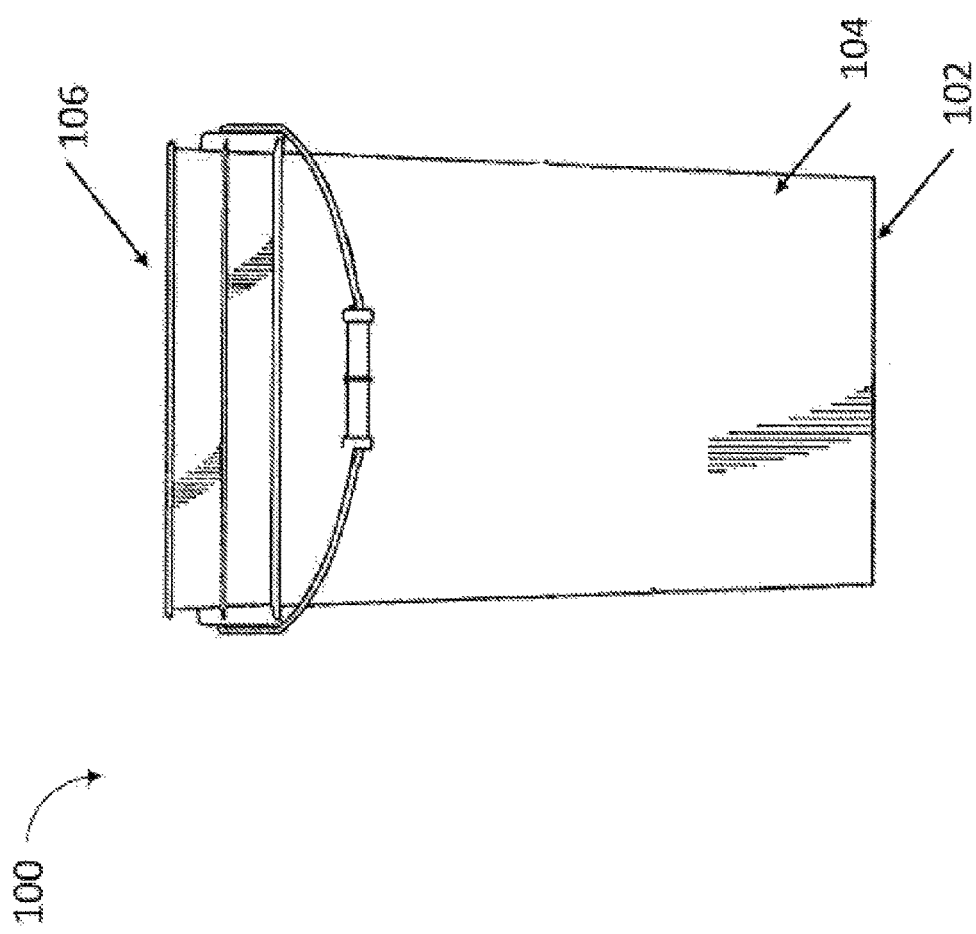
FIG. 3 is a front view of the bucket according to some embodiments.
Figure 4:
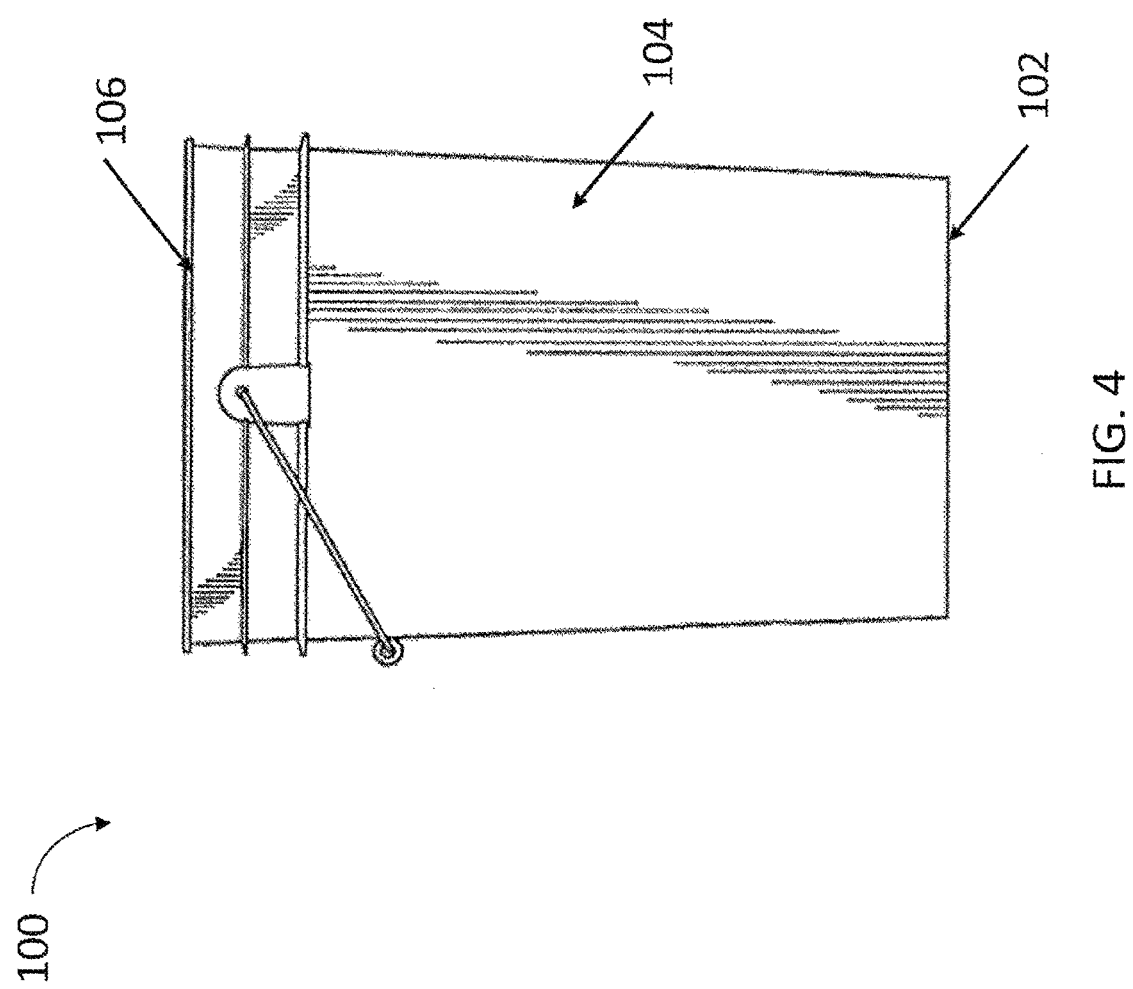
FIG. 4 is a right view of the bucket according to some embodiments.
Figure 5:
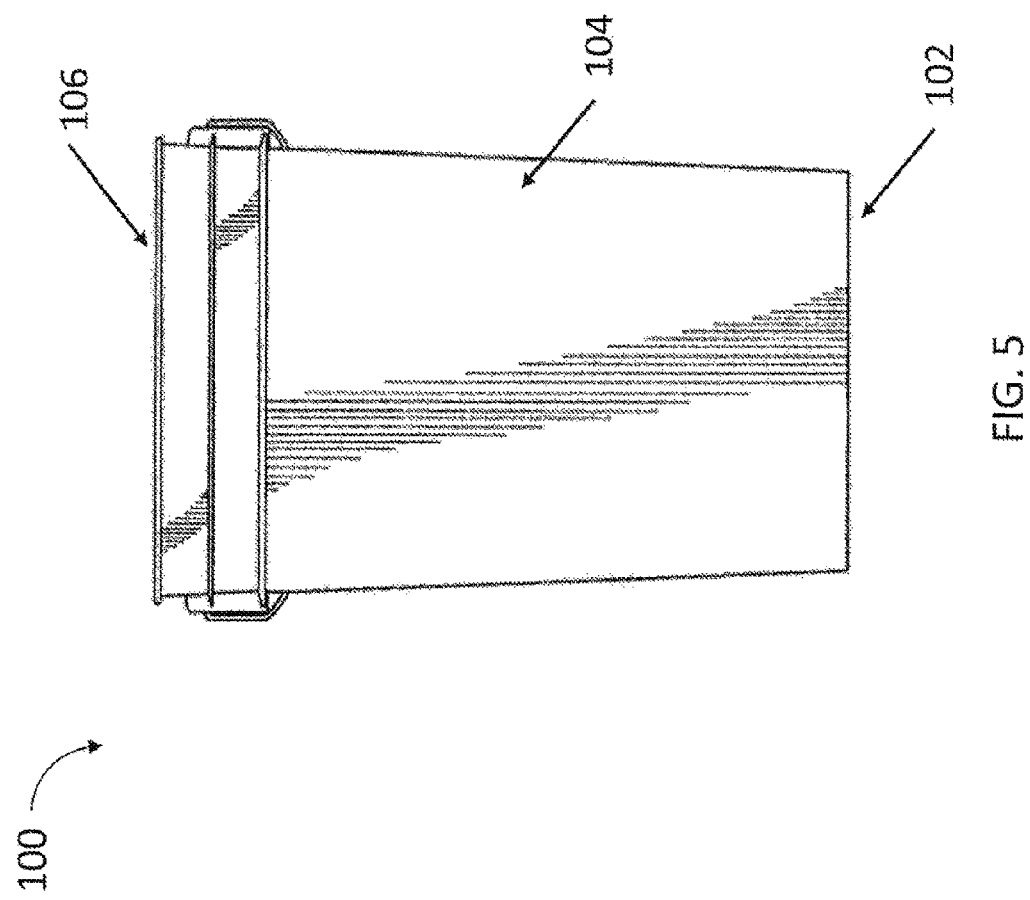
FIG. 5 is a back view of the bucket according to some embodiments.
Figure 6:
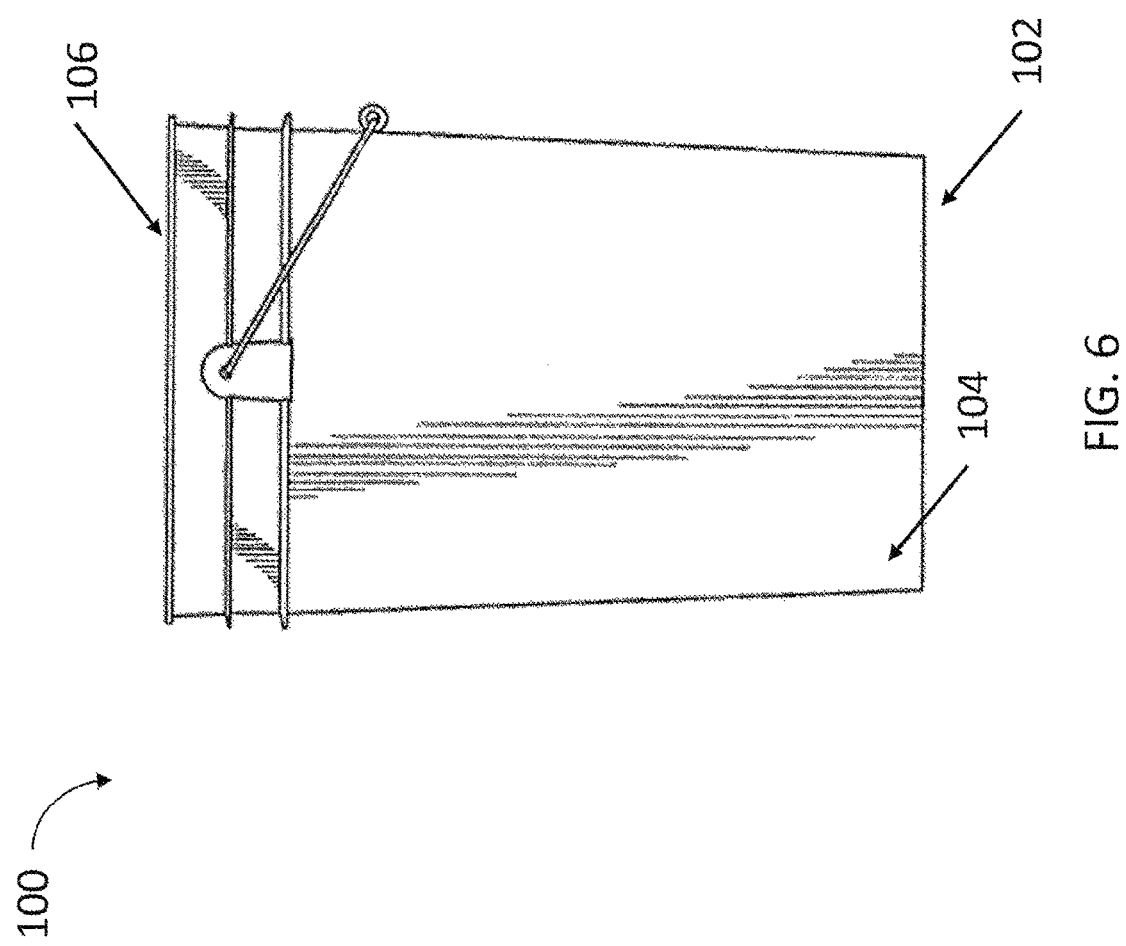
FIG. 6 is a left view of the bucket according to some embodiments.
Figure 7:
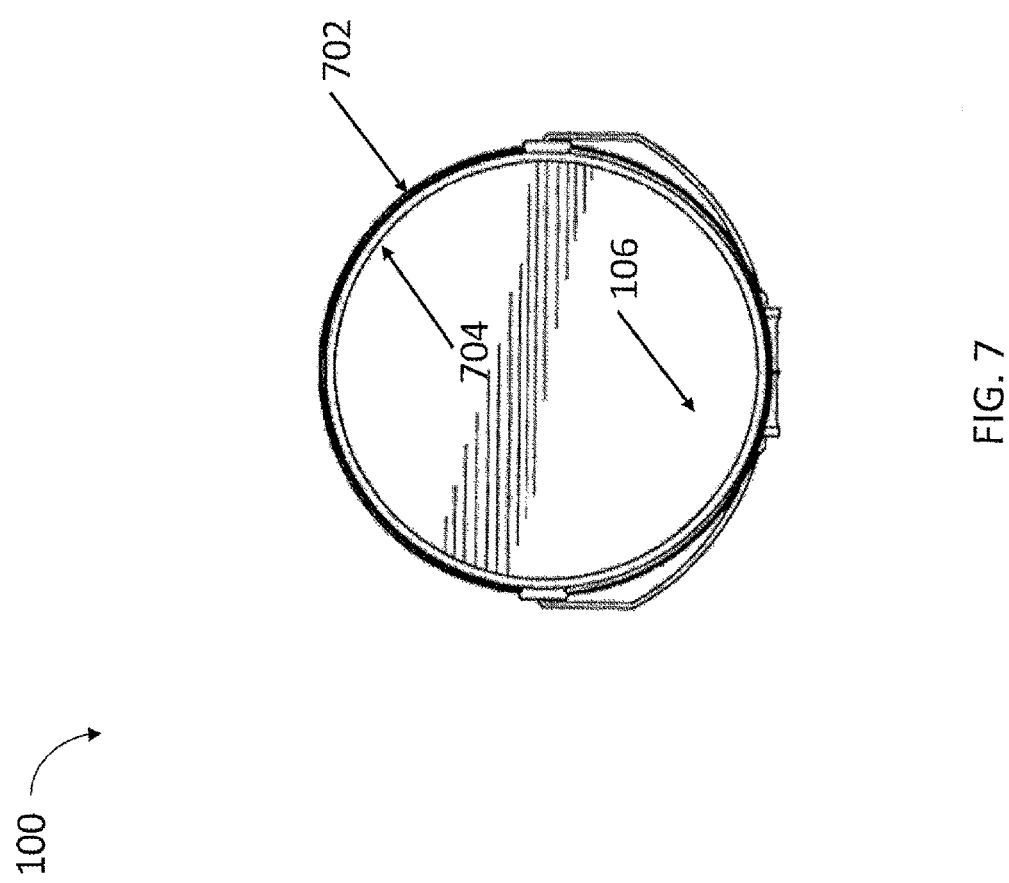
FIG. 7 is a top view of the bucket according to some embodiments.

Turning now to the Figures where like numbers represent like elements, FIGS. 1-8 illustrate several views of the bucket. FIG. 1 is a first front perspective view of a bucket according to some embodiments. FIG. 2 is a third front perspective view of a bucket according to some embodiments. FIG. 3 is a front view of the bucket according to some embodiments. FIG. 4 is a right view of the bucket according to some embodiments. FIG. 5 is a back view of the bucket according to some embodiments. FIG. 6 is a left view of the bucket according to some embodiments. FIG. 7 is a top view of the bucket according to some embodiments. FIG. 8 is a bottom view of the bucket according to some embodiments.

As illustrated in FIG. 1, the bucket 100 may have at least a bottom portion 102 which may be integrally attached to at least a side wall portion 104. FIG. 1 illustrates the side wall portion 104 to be cylindrical in shape. However, it is appreciated by those of ordinary skill in the art, the side wall portion 104 may have a plurality of different structures including triangular, rectangular, trapezoidal, square and the like. Additionally, with the plurality of different shapes and sizes of the bucket 100, the side wall portion 104 may have a plurality of sides (not shown). The side wall portion 104 may vary depending on the size and shape of the bucket 100 structure.

In FIG. 1, the side wall portion 104 takes up the entire area of the bottom portion 102 of the bucket 100. The side wall portion 104, in the embodiment of FIG. 1, represents the largest viewing surface to the individual.

The side wall portion 104 may also be integrally attached to a top area 106. The top area 106 may contain an opening for allowing an individual to place liquids, solids, or other items for storage inside the bucket 100. It is recognized that there may not be an opening, or the opening may be located in a different area besides the top area 106. Furthermore, the opening can be as wide as the diameter or the width of the side wall portion 104, or may be a different width or diameter. Furthermore, the opening may alternatively come together in a flask like configuration.

The bucket 100 can be made of a variety of different materials and from different processes. For example, the bucket 100 can be made from one or more of: recycled Polypropylene feedstocks, clarified polypropylene, impact resistant modified polypropylene (e.g., synthetic rubber, metalecines, EVA, elastomers, etc.), plant-based polymers, thermal plastics, and high density polyethylene (HDPE) for low temperature impact performance. HDPE has the advantage of being inert and therefore compatible with a variety of compounds. Thus, testing of compatibility with HDPE may be reduced or avoided. HDPE is also reasonably priced.

The bucket 100 can be made by co-injection technology to incorporate recycle feedstock as a multi-layer structure. Co-injection technology is where two or more individual melt streams unite to make a single article or material. The co-injection technology can be used to apply gas barrier materials in a multi-layer composition. The bucket 100 can also be produced by over molding, which is an injection molding process where one material is molded onto a second material.

A variety of surface treatments can be applied to the surface of the bucket 100. For example, one or more surfaces of the bucket 100 can be plasma treated to enhance gas barrier properties.

When referring to the surfaces, it may be one or more surfaces of the interior of the bucket, one or more surfaces of the exterior of the bucket, or may be a multi-layer where there is a material that serves the treatment purposes.

Further, one or more surfaces of the bucket 100 can be treated or coated with gas barrier materials such as EVOH, PHAE, MXD-6 nylon, LCP, LCP (liquid crystal polymers), blends of known gas barrier materials, plasma coating, and thermoplastic or thermoset coatings. Gas barrier properties are advantageous for food and oxygen sensitive products. For example, buckets that can hold five gallons of food products that are oxygen sensitive can be very useful when shipping to restaurants in volume. The surfaces treated or coated with gas barrier materials may be plasma treated or coated with thermoplastics (Acrylics) or thermosets to enhance gas barrier properties. Thermosets may include highly reacted expoxys or other food contact materials.

The process of overmolding may also be applied where there may be more than one material. Overmolding is known generally as an injection molding process where one material is molded onto a second material. In overmolding, the second material may be an existing bucket which could serve as a blank or preform. Alternatively, the second material could be preformed into a bucket and therefore be a preform or blank. Advantages of some embodiments incorporating overmolding are the reduction of costs of having a cheaper material and a more expensive material. For example, the more expensive material may be gas impermeable and thus may need less of it if overmolding was used. Applying this to the gas barriers (although not limited to this application), multi-layer arrangement allow for the transport of perishable items in buckets that are generally not purposed for perishable items. Although rice, wheat, and beans have been transported traditionally, other more-oxygen-sensitive goods are generally not transported using these industrial sized buckets.

As illustrated in FIG. 7 (top view of the bucket 100), the side wall portion 104 may have an outer side 702 and an inner side 704.

Figure 9:
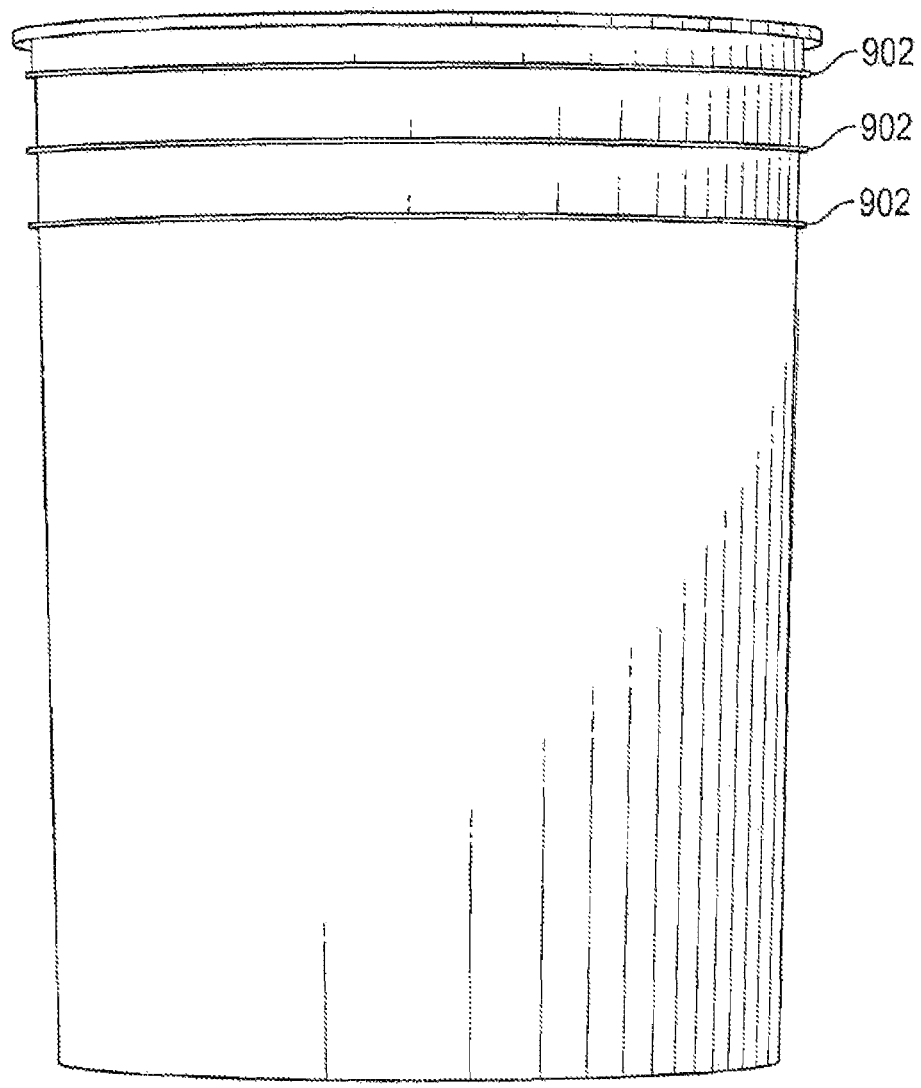
FIG. 9 is a third front perspective view of the bucket with stacking lugs according to some embodiments.

FIG. 9 is a third front perspective view of the bucket 100 with stacking lugs 902 according to some embodiments. The bucket 100 may include stacking lugs 902 for ease of de-nesting. Buckets are generally nested and are often times hard to separate. However, the lugs 902 provide an air gap that reduces vacuum or friction when the buckets are pulled apart. The vacuum created by the inner pulling can be very strong. The stacking lugs create an airspace that prevents the vacuum. Although FIG. 9 shows three stacking lugs, there can be more or less, can be placed in different areas of the bucket 100 and can be of different shapes and sizes. The buckets 100 can be stacked individually and/or on pallets. For example, buckets 100 can be stacked on pallets with high stacking capability. Advantageously over buckets that are limited to double stacking, the large number of buckets of the present disclosure can be stacked on a pallet with high stacking capability, restricted by ceiling height and structural support.

Figure 10:
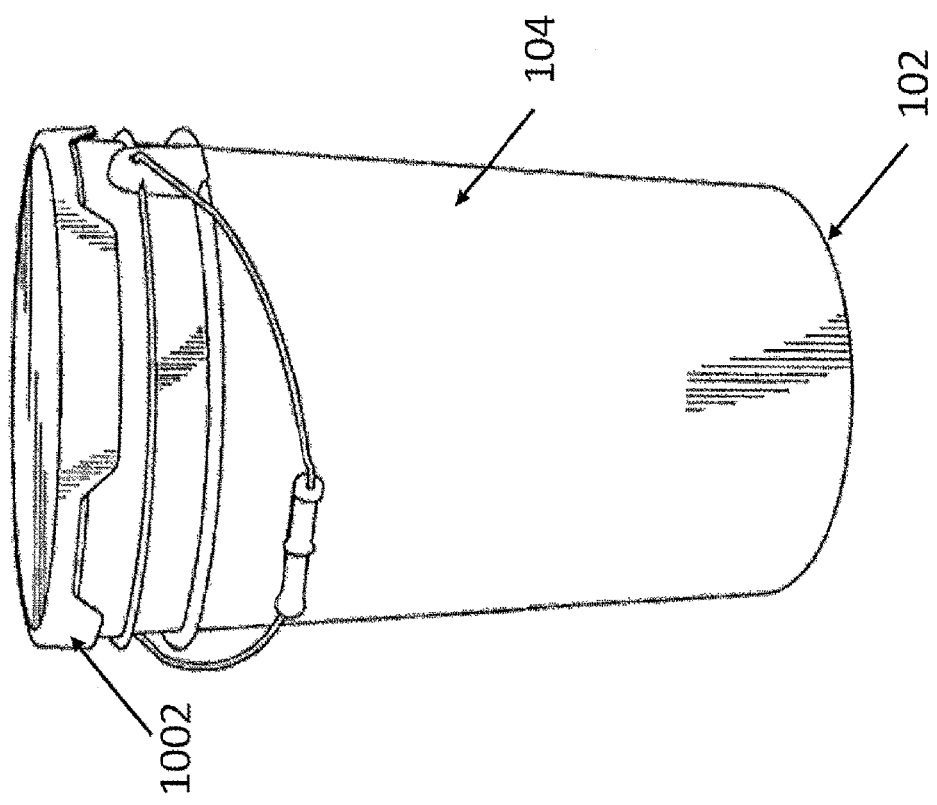
FIG. 10 is a forth front perspective view of the bucket showing a lid disposed thereon according to some embodiments.
Figure 11:
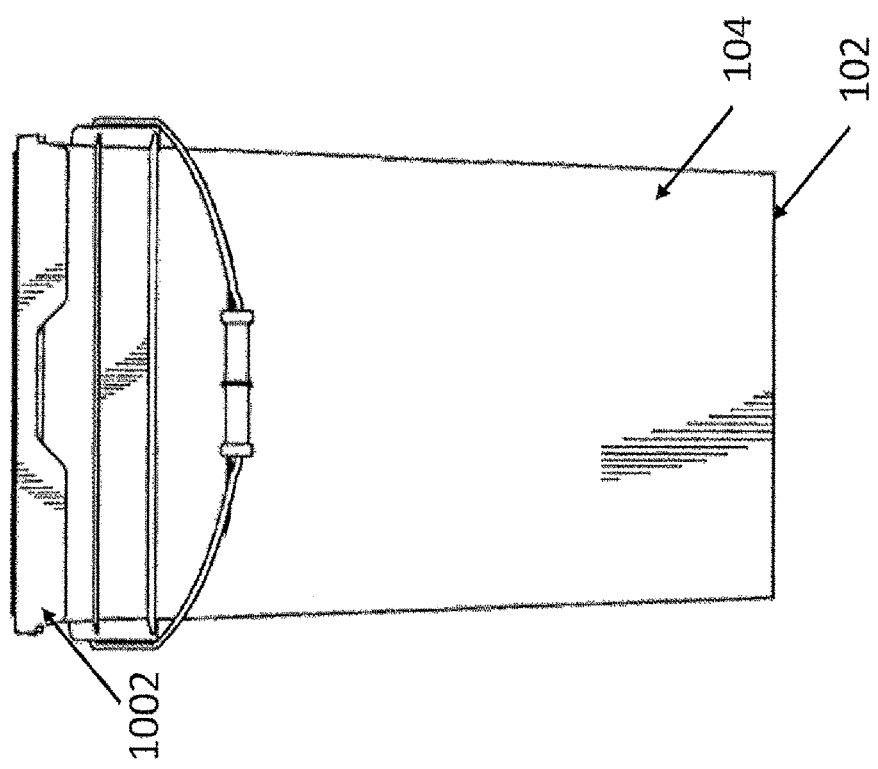
FIG. 11 is a front view of the bucket and with the lid disposed thereon according to some embodiments.
Figure 12:
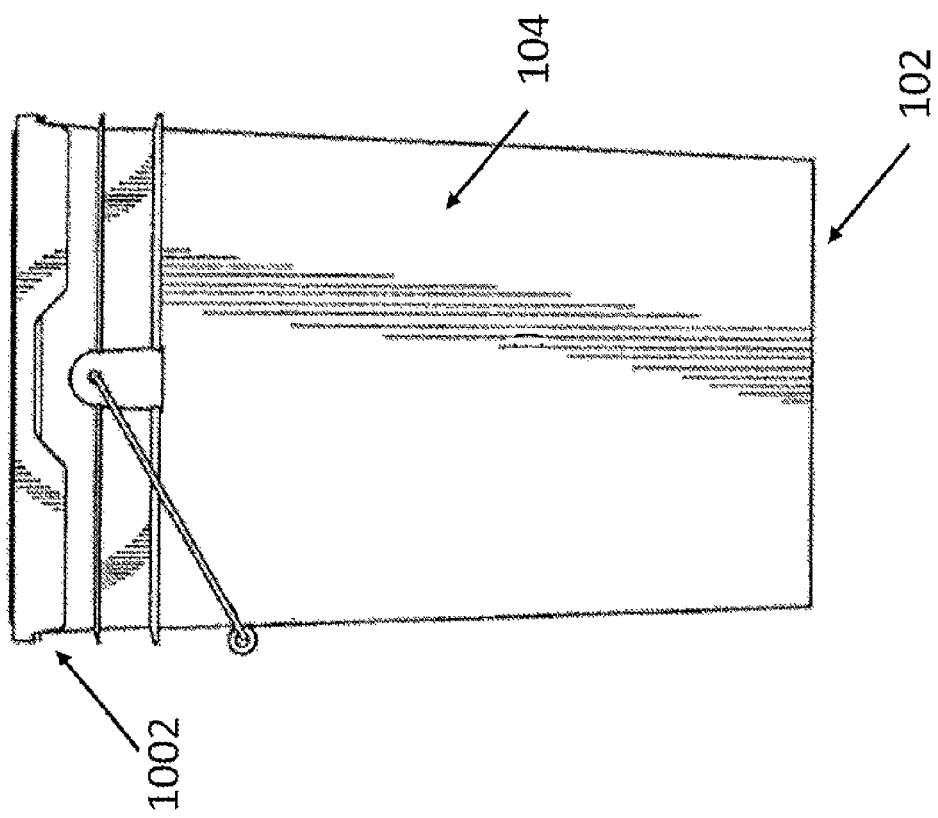
FIG. 12 is a right view of the bucket and with the lid disposed thereon according to some embodiments.
Figure 13:
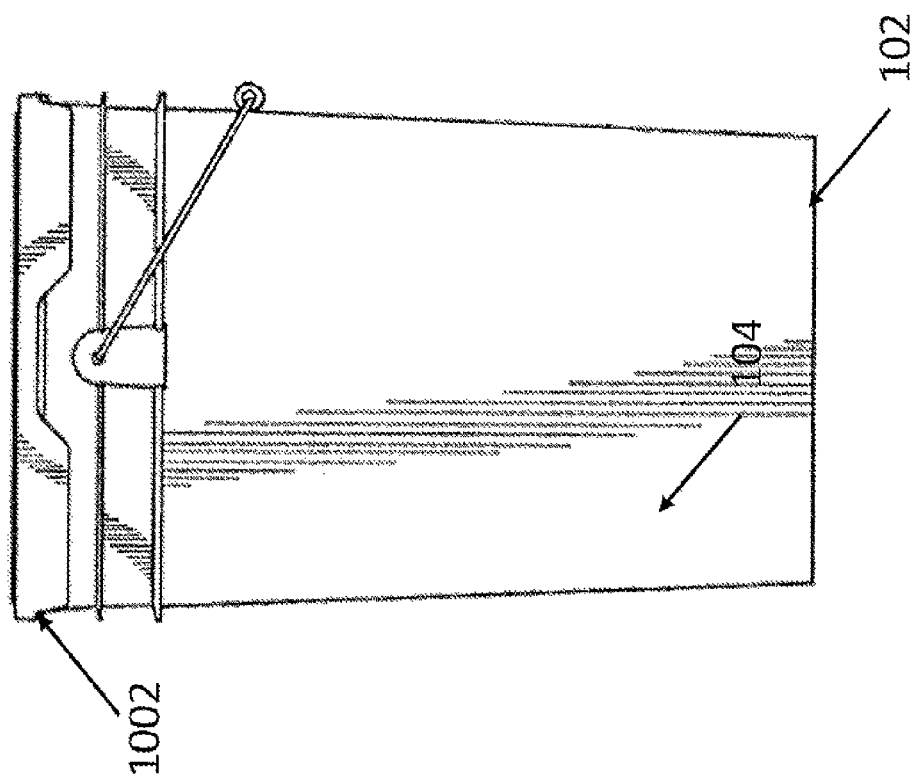
FIG. 13 is a left view of the bucket and with the lid disposed thereon according to some embodiments.
Figure 14:
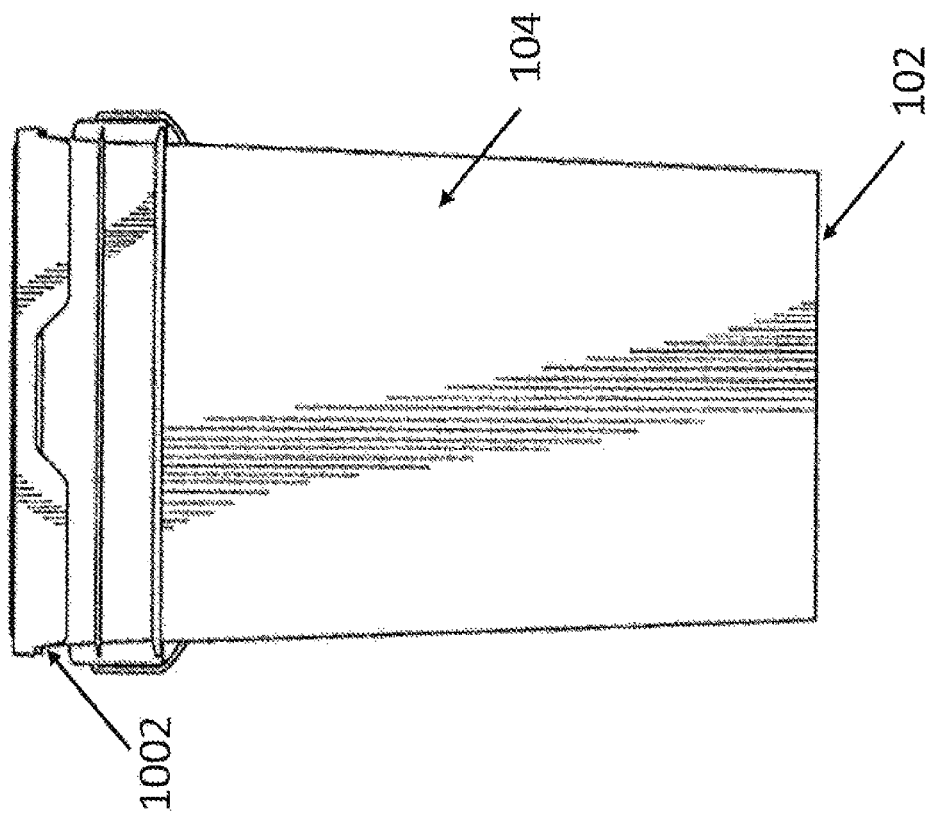
FIG. 14 is a back view of the bucket with the lid disposed thereon according to some embodiments.
Figure 15:
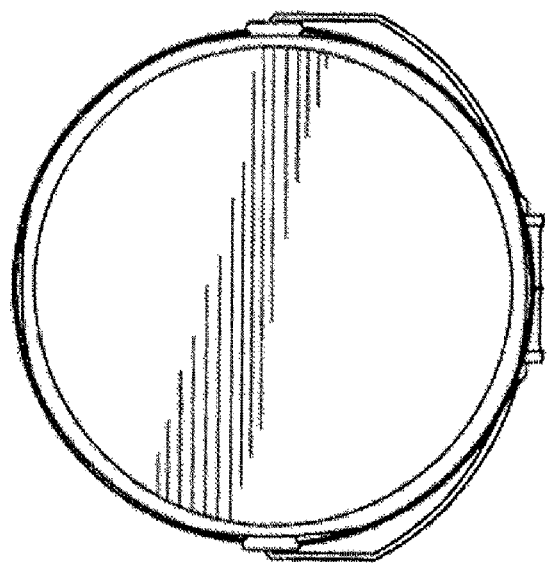
FIG. 15 is a top view of the bucket with the lid disposed thereon according to some embodiments.

FIG. 10 is a forth front perspective view of the bucket 100 showing a lid 1002 disposed thereon according to some embodiments. FIG. 11 is a front view of the bucket 100 with the lid 1002 disposed thereon according to some embodiments. FIG. 12 is a right view of the bucket 100 with the lid 1002 disposed thereon according to some embodiments. FIG. 13 is a left view of the bucket 100 with the lid 1002 disposed thereon according to some embodiments. FIG. 14 is a back view of the bucket 100 with the lid 1002 disposed thereon according to some embodiments. FIG. 15 is a top view of the bucket 100 with the lid 1002 disposed thereon according to some embodiments.

As illustrated in FIG. 10, the bucket 100 may include a lid 1002. In FIG. 10, the lid 1002 has an outer edge and an inner edge where the inner edge is connected to the side wall portion 104 of the bucket 100. However, other designs of the lid 1002 in relation to the bucket 100 are appreciated. For example, the outer circumference of the lid 1002 may be the same as the inner circumference of the top area 106 of the bucket 100. The lid 1002 may be snap fit, fastened, or attached to the bucket 100, and configured to allow the lid to be detached from the bucket 100. The lid 1002 may be a completely separate piece from the bucket 100 or may be a part of the bucket 100 that can be moved in a way to create a closing member for the bucket 100. The lid may be any closing member of the opening in the bucket 100.

Figure 16:
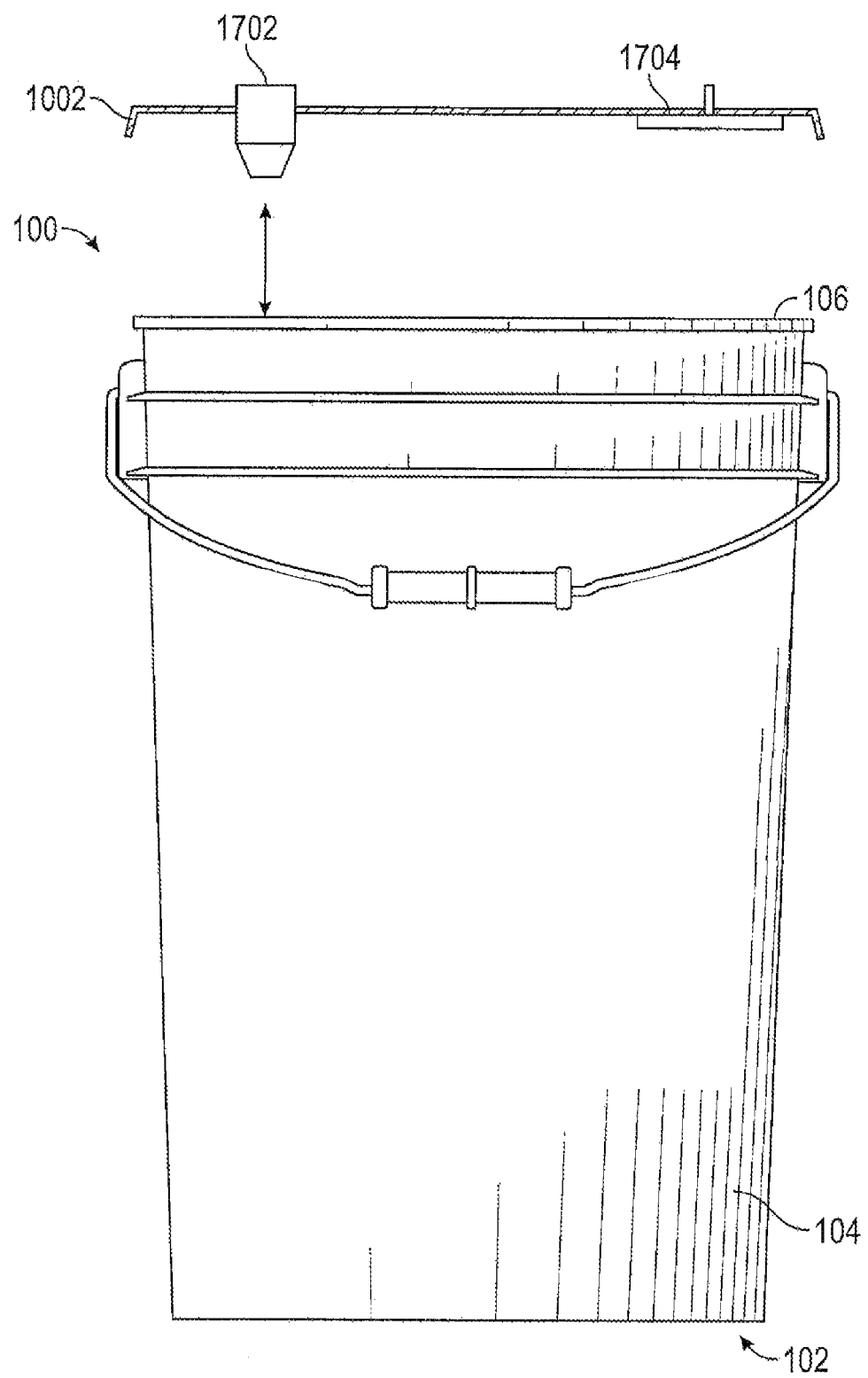
FIG. 16 is a front view of the lid with a septum and membrane according to some embodiments.

FIG. 16 is a front view of the lid with a septum and membrane according to some embodiments. The lid 1002 may be configured such that the bucket 100 can be used for packaging dry goods as well as liquids and food products. A septum 1702 or receptacle may be installed or molded into the lid 1002 for the purposes of injecting inert gases or flushing the headspace. A septum 1702 may include a means to insert a needle or probe to inject or extract gas or liquid from containers that are at atmospheric pressure. The combination of septums and valves allow the headspace to be flushed with, for example, nitrogen where the absence of oxygen is required. Injecting a drop or more of liquid nitrogen into the bucket 100 may create a nitrogen rich environment with positive pressure. This is advantageous because only a septum 1702 is required and not gas flow to flush the headspace.

Furthermore, a membrane 1704 is shown in FIG. 16. This membrane 1704 may be used as a relief valve which controls or limits the pressure in the bucket 100. Pressure may be relieved allowing the pressurized substance to flow from an auxiliary passage out of the bucket. The relief valve may have a predetermined set pressure to protect pressure vessels and other equipment from being subject to excess pressure. In some embodiments, the septum 1702 can perform one or more functions of the membrane, such as a pressure relief valve. For example, the septum 1702 can release pressure if the pressure within the receptacle 100 is too high and/or if the liquid is too hot.

In some embodiments, the septum 1702 and/or the membrane 1704 can allow substance (such as liquid and/or pressure gas) to enter into the receptacle 100. In some embodiments, the septum 1702 and/or the membrane 1704 can release substance (such as liquid and/or pressure gas) out of the receptacle 100.

In some embodiments, a lid 1002 can provide a closure and/or seal for the bucket 100, such as in FIG. 16. For example, the lid can include a snap fit mechanism, such as a screw on, a lug, and the like. The septum can be disposed on the lid. For example, the septum can be installed on the lid and/or molded onto the lid. In some embodiments, the lid and/or the bag can comprise separate closures for the substance. For example, the lid can provide a seal for the bucket and the bag can provide a seal for the substance within the bucket. In some embodiments, the bag can provide a seal for a first substance, and a second substance can be external to the bag but internal to the receptacle. As such, the two substances can be separated within the receptacle. In some embodiments, the closure can include a snap fit mechanism to fasten to the bucket and/or the lid, such as via a screw on, a lug, and the like. In some embodiments, the septum can be placed onto the closure and/or the lid, such as by installing or molding onto the closure. In some embodiments, the septum can be installed on the closure to enable purging of headspace and/or intake or outtake of material to and from the bucket.

In some embodiments, the septum, such as the septum 1702 of FIG. 16, can include a valve, a Luer-type fitting, other type of resealable opening through which one or more gases can be introduced into and/or out of the receptacle, then resealed to prevent the one or more gases from escaping, and the like. The septum 1702 can allow the flow of inert nitrogen gas to enter and/or leave a bucket.

Figure 17A:
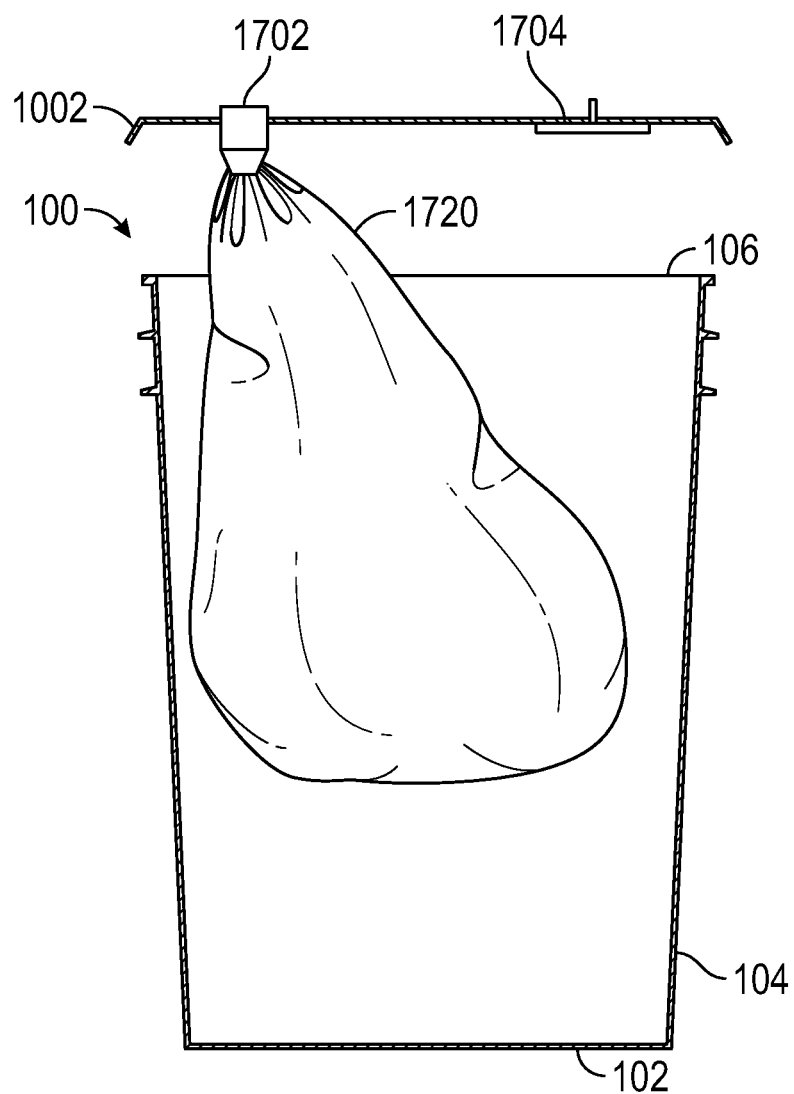
FIG. 17A is a cross-sectional front view of the receptacle with a lid and a bag according to some embodiments.
Figure 17B:
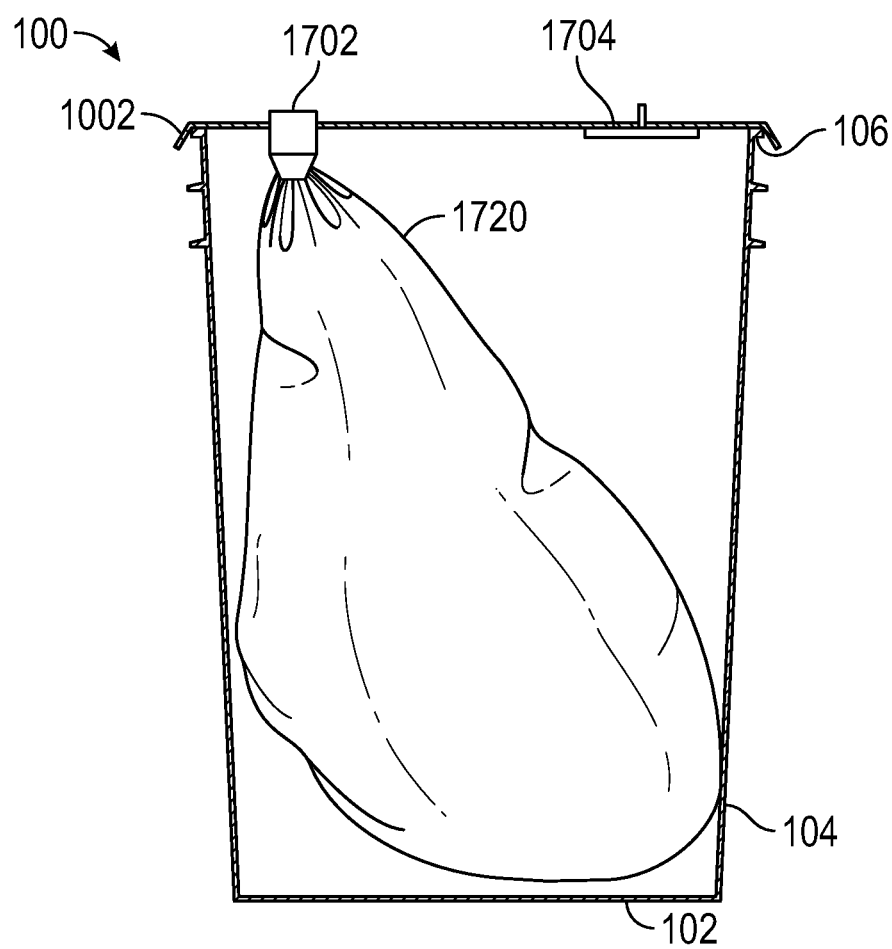
FIG. 17B is a cross-sectional front view of the receptacle with an attached lid and a bag according to some embodiments.

FIG. 17A is a cross-sectional front view of the receptacle with a lid and a bag according to some embodiments. FIG. 17B is a cross-sectional front view of the receptacle with an attached lid and a bag according to some embodiments. In some embodiments, the bag 1720 can be placed into the bucket 100. The bag 1720 can be attached to the lid 1002 for ease of purging of headspace. The bag 1720 can be attached to the lid 1002 for ease of intake and/or outtake of substance inside of the bucket, such as pouring of liquid from within the bucket 100. In some embodiments, the bag 1720 can be attached to and detached from the septum 1702 of the lid 1002 and/or the membrane 1704 of the lid 1002.

In some embodiments, nitrogen can be used to create a nitrogen blanket inside of the receptacle 100 and/or the bag 1720. A nitrogen blanket can include a blanket of gas. In some embodiments, the nitrogen blanket can include one or more gases, including nitrogen. In some embodiments, a gas blanket including gases other than nitrogen can be used. In some embodiments, the gas blanket can include aseptic substances, such as gases free of germs and/or bacteria. In some embodiments, the gas blanket can include a liquid injected into the receptacle 100 and/or the bag 1720. For example, a few drops of gas (such as liquid nitrogen) can be inserted to the top of the bag into the headspace. In response, the gas blanket can vaporize. As a result, air in the headspace is reduced. Advantageously, other substances, such as perishables, can last a longer time.

In some embodiments, the nitrogen can be supplied by a source which is under pressure and/or a source of compressed nitrogen. In some embodiments, nitrogen can be inserted into the receptacle 100 via the septum 1702 to create the nitrogen blanket in the receptacle 100. In some embodiments, nitrogen can be inserted into the bag 1720 via the septum 1702 to create the nitrogen blanket within the bag 1720. In some embodiments, the nitrogen can be inserted into the bag 1720 while the bag 1720 is disposed within the receptacle 100 and/or while the bag 1720 is external to the receptacle 100.

In some embodiments, the bucket 100 and/or the bag 1720 can include a nitrogen blanket that can at least reduce and/or eliminate oxygen in the headspace. One or more methods of creating the nitrogen blanket can be used. In some embodiments, continuous purge blanketing can be used to create the nitrogen blanket. Continuous purge blanketing can include the use of a continuous flow of nitrogen. The continuous flow of nitrogen can help to maintain safe oxygen concentrations within a bucket headspace. In some embodiments, pressure control blanketing can be used to create the nitrogen blanket. Pressure control blanketing can include introducing nitrogen into a bucket headspace to maintain a predetermined pressure. The pressurization of nitrogen can minimize air in-bleed and/or can reduce nitrogen usage. In some embodiments, concentration control blanketing can be used to create the nitrogen blanket. Concentration control blanketing can include an oxygen monitoring system that controls the flow of nitrogen into the headspace of the bucket. The concentration control system can help enable precise operation and reduce gas usage. In some embodiments, other methods of nitrogen blanketing can be used to create the nitrogen blanket. In some embodiments, the nitrogen delivery system maintains a low pressure to prevent over pressurization of the receptacle. In some embodiments, high pressure of nitrogen is used to create the nitrogen blanket, for example, in applications to prevent liquids disposed in the receptacle to turn into a gas and/or vapor state.

In some embodiments, a carbon dioxide blanket can be used to create a nitrogen blanket inside of the receptacle 100 and/or the bag 1720. Carbon dioxide can function as an inert gas. In some embodiments, the carbon dioxide blanket can include one or more gases, including carbon dioxide. As a result, air in the headspace is reduced. Advantageously, other substances, such as perishables, can last a longer time and/or the cost of the blanket can be reduced by using the carbon dioxide blanket. For example, the taste of certain perishable food are not affected by carbon dioxide. In these circumstances, the carbon dioxide blanket can be an alternative to the nitrogen blanket. In some embodiments, dry ice can be packaged whereby carbon dioxide can be permeated into the headspace as a time release gas. The carbon dioxide can be of higher, e.g. slightly higher, permeation than the polymer of the receptacle 100 and/or the bag 1720 in the receptacle 100. Accordingly, a shelf life of perishable goods can be extended.

In some embodiments, the bag 1720 can provide a gas barrier. The bag can be placed inside of the bucket 100 to provide the gas barrier. In some embodiments, the septum 1702 and/or the membrane 1704 can be attached to a bag. The septum 1702 can be attached to the bag, such as by integrating the bag 1720 into an opening of a septum 1702, attaching the film of the bag to the septum 1702, and the like. The septum 1702 can purge the headspace in the closure of the bag 1720. In some embodiments, the bucket 100 can provide at least a partial gas barrier and/or the bag 1720 can provide a partial gas barrier. The bucket 100 and the bag 1720 can both provide synergistic and/or compounding gas barrier characteristics. In some embodiments, the bag can provide the gas barrier and the bucket can be used to transport goods within the bag. The bucket and/or the bag can be the passive gas barrier. In some embodiments, the bucket 100 can provide gas barrier characteristics for a first substance and the bag 1720 can hold a second substance and provide gas barrier characteristics for a second substance. Advantageously, a bucket 100 can include two substances with different gas barrier characteristic requirements.

In some embodiments, the bag 1720 provides protection of the substances within the receptacle 100. Advantageously, the bag 1720 allows for the substances within the receptacle 100 to absorb shock. For example, if a receptacle 100 is dropped from a certain distance and/or lands at a certain speed and/or acceleration, the bag 1720 can absorb the shock caused on the receptacle 100 and/or the movement of the substances within the bag 1720. In some embodiments, the substances can place pressure on the bag 1720 and less pressure on the receptacle 100 and/or the lid 1002 than if the substances were placed directly in the receptacle 100 without the bag 1720. In some embodiments, the bag 1720 can hold the structure of the substance better than if the substance was within the receptacle 100 without the bag 1720. For example, the bag can follow the contours of the substance within the bag 1720 to hold the structure of the substance in place during impact. In some embodiments, the gas barrier can be added to the receptacle 100 and/or the bag 1720. According to one method, a user could follow the steps set forth above and including without limitation adding perishable goods into a bag, attaching the bag to the septum, attaching the lid to the receptacle, inserting a gas barrier to the bag and/or the receptacle, and stacking the bucket on a pallet with other buckets. In some embodiments, the bag and/or receptacle of one or more embodiments allows storage of large quantities of perishable items. Advantageously, these receptacles can be stacked on top of each other on a pallet. Many receptacles can be stacked onto one or more pallets to enable transportation of a large quantity of goods. The pallets can be parachuted to areas, such as remote areas and/or areas affected by a natural disaster. The bag and/or bucket can help absorb shock from the pallet reaching the ground from a parachute delivery.

Figure 17C:
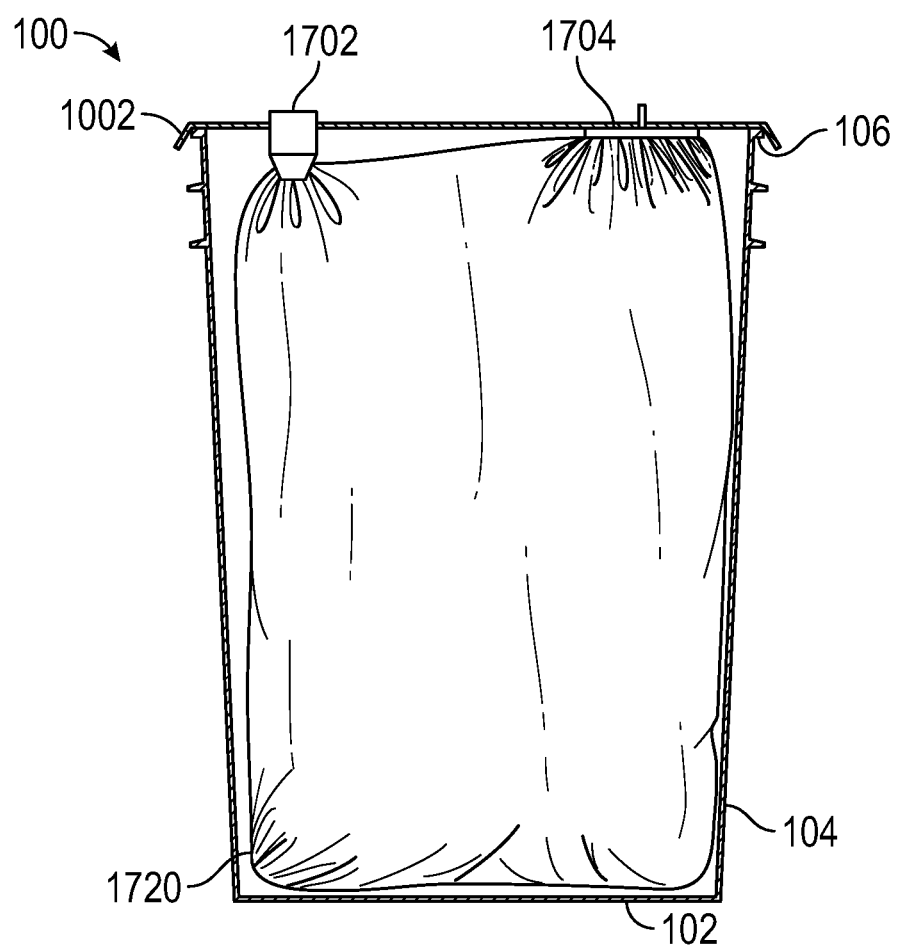
FIG. 17C is a cross-sectional front view of the receptacle with the bag attached to both the septum and the membrane according to some embodiments.

In some embodiments, the bag 1720 can be attached to the septum 1702 and/or the membrane 1704. FIG. 17C is a cross-sectional front view of the receptacle with the bag attached to both the septum and the membrane according to some embodiments. In some embodiments, the bag 1720 can be attached either to the septum 1702 or the membrane 1704. Advantageously, the bag 1720 can be installed to enable substance to enter and/or leave the bag via the septum 1702 and/or the membrane 1704.

In some embodiments, the bag 1720, the lid 1002, the septum 1702, and/or the membrane 1704 can be made of one or more materials and from one or more processes. The bag 1720, the lid 1002, the septum 1702, and/or the membrane 1704 can comprise a gas barrier film. In some embodiments, the bag 1720, the lid 1002, the septum 1702, and/or the membrane 1704 can be made from one or more of: recycled Polypropylene feedstocks, clarified polypropylene, impact resistant modified polypropylene (e.g., synthetic rubber, metalecines, EVA, elastomers, etc.), plant-based polymers, thermal plastics, and high density polyethylene (HDPE) for low temperature impact performance. HDPE has the advantage of being inert and therefore compatible with a variety of compounds. Thus, testing of compatibility with HDPE may be reduced or avoided, and cost reduced.

In some embodiments, the bag 1720, the lid 1002, the septum 1702, and/or the membrane 1704 can be made by co-injection technology to incorporate recycle feedstock as a multi-layer structure. Co-injection technology is where two or more individual melt streams unite to make a single article or material. The co-injection technology can be used to apply gas barrier materials in a multi-layer composition. The bag 1720, the lid 1002, the septum 1702, and/or the membrane 1704 can also be produced by over molding, which is an injection molding process where one material is molded onto a second material.

In some embodiments, a variety of surface treatments can be applied to the surface of the bag 1720, the lid 1002, the septum 1702, and/or the membrane 1704. For example, one or more surfaces of the bag 1720, the lid 1002, the septum 1702, and/or the membrane 1704 can be plasma treated to enhance gas barrier properties.

In some embodiments, one or more surfaces of the bag 1720, the lid 1002, the septum 1702, and/or the membrane 1704 can be treated or coated with gas barrier materials such as EVOH, PHAE, MXD-6 nylon, LCP, LCP (liquid crystal polymers), blends of known gas barrier materials, plasma coating, and thermoplastic or thermoset coatings. Gas barrier properties are advantageous for food and oxygen sensitive products. For example, buckets that can hold five gallons of food products that are oxygen sensitive can be very useful when shipping to restaurants in volume. The surfaces treated or coated with gas barrier materials may be plasma treated or coated with thermoplastics (Acrylics) or thermosets to enhance gas barrier properties. Thermosets may include highly reacted expoxys or other food contact materials.

Figure 17D:
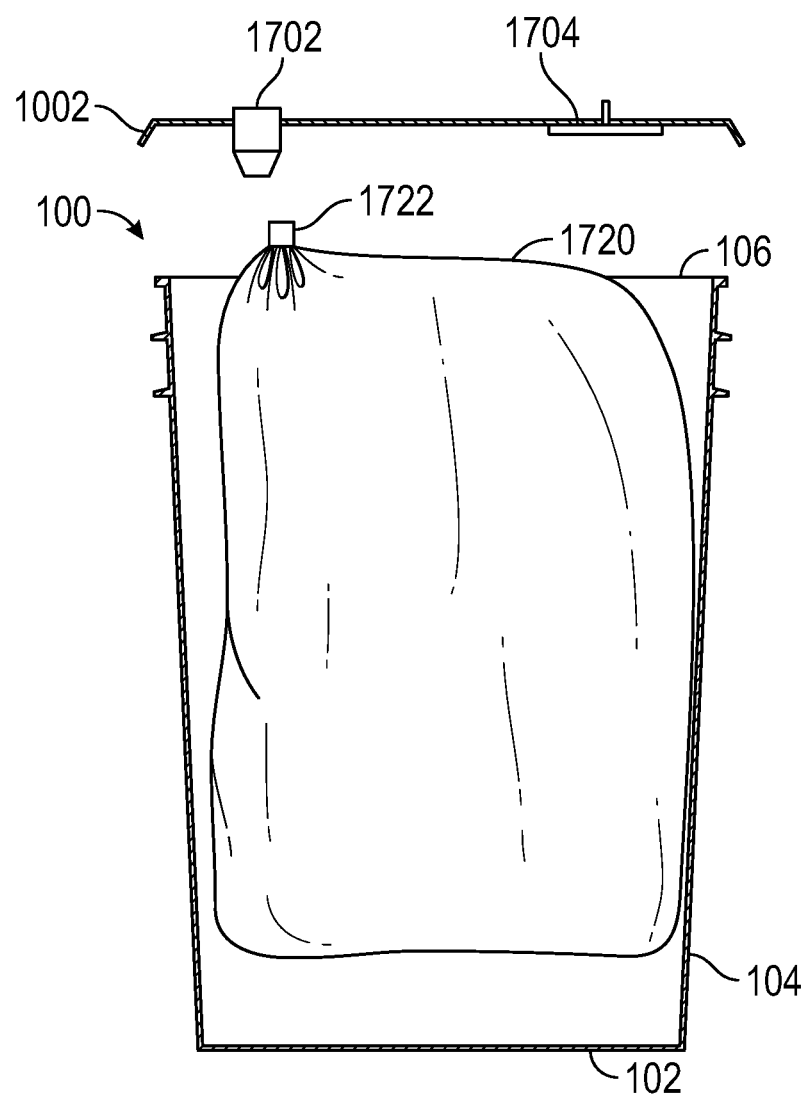
FIG. 17D is a cross-sectional front view of the receptacle with a detached bag from the lid according to some embodiments.

In some embodiments, the bag 1720 can be mountable to and demountable from the lid 1002. FIG. 17D is a cross-sectional front view of the receptacle with a detached bag from the lid according to some embodiments. For example, the bag 1720 can include an attaching and/or detaching mechanism 1722 and/or the septum 1702 can include an attaching and/or detaching mechanism 1724. In some embodiments, the attaching and/or detaching mechanism 1722 of the bag 1720 aligns with the attaching and/or detaching mechanism 1724 of the septum 1702 to mount/demount the bag 1720 with the septum 1702.

In some embodiments, the bag 1720 can be attached and/or detached from the lid 1002 by attaching and/or detaching from the septum 1702 and/or the membrane 1704. In some embodiments, the bag 1720 can be attached and/or detached from the lid 1002 by attaching and/or detaching from at least a portion of the wall of the lid 1002. The bag 1720 can be attached and/or detached from the lid 1002 by a clamping and/or snapping mechanism. For example, the bag 1720 can include a clamping structure secured to the bag and attachable/detachable to a socket structure of a septum 1702 to be clamped. In some embodiments, the bag can be attached and/or detached from the lid 1002 by a threaded attachment/detachment mechanism. For example, the bag 1720 can be inserted into an opening of the septum 1702 and a threaded attachment of the septum 1702 can align with a threaded attachment of the bag 1720 to attach the bag 1720 with the septum 1702.

Figure 17E:
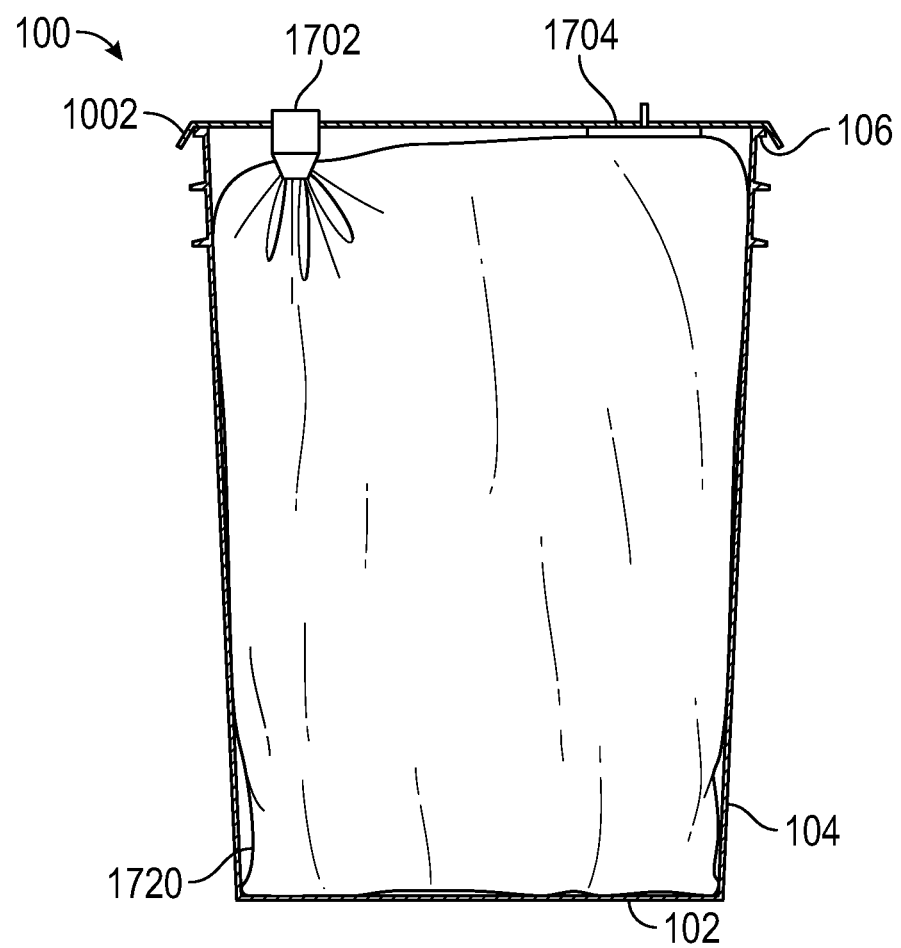
FIG. 17E is a cross-sectional front view of the receptacle with the bag as a liner to the receptacle according to some embodiments.

In some embodiments, the bag can be a liner following the inside walls of the bucket 100. FIG. 17E is a cross-sectional front view of the receptacle with the bag as a liner to the receptacle according to some embodiments. In some embodiments, the bag 1720 can be a liner to the receptacle 100 by attaching to at least a portion of the bottom wall of the receptacle 100. In some embodiments, the bag 1720 can be a liner to the receptacle 100 by attaching to at least a portion of one or more side walls of the receptacle 100. In some embodiments, the bag 1720 can be a liner to the receptacle 100 by attaching to least a portion of one or more walls of the receptacle 100. In some embodiments, the bag 1720 can be a liner to the receptacle 100 by attaching to at least a portion of the lid 1002. In some embodiments, the bag 1720 can be a liner to the receptacle 100 by being disposed adjacent to at least a portion of one or more walls of the receptacle 100.

Figure 17F:
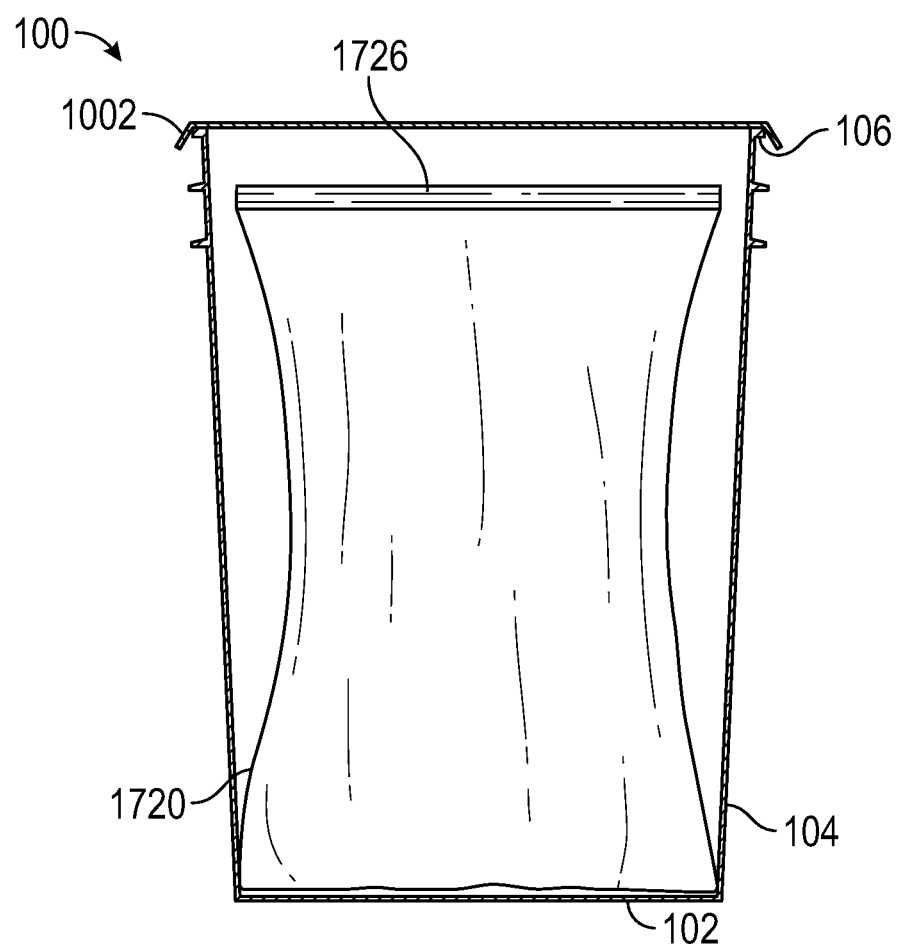
FIG. 17F is a cross-sectional front view of the receptacle with a heat-sealed bag according to some embodiments.
Figure 17G:
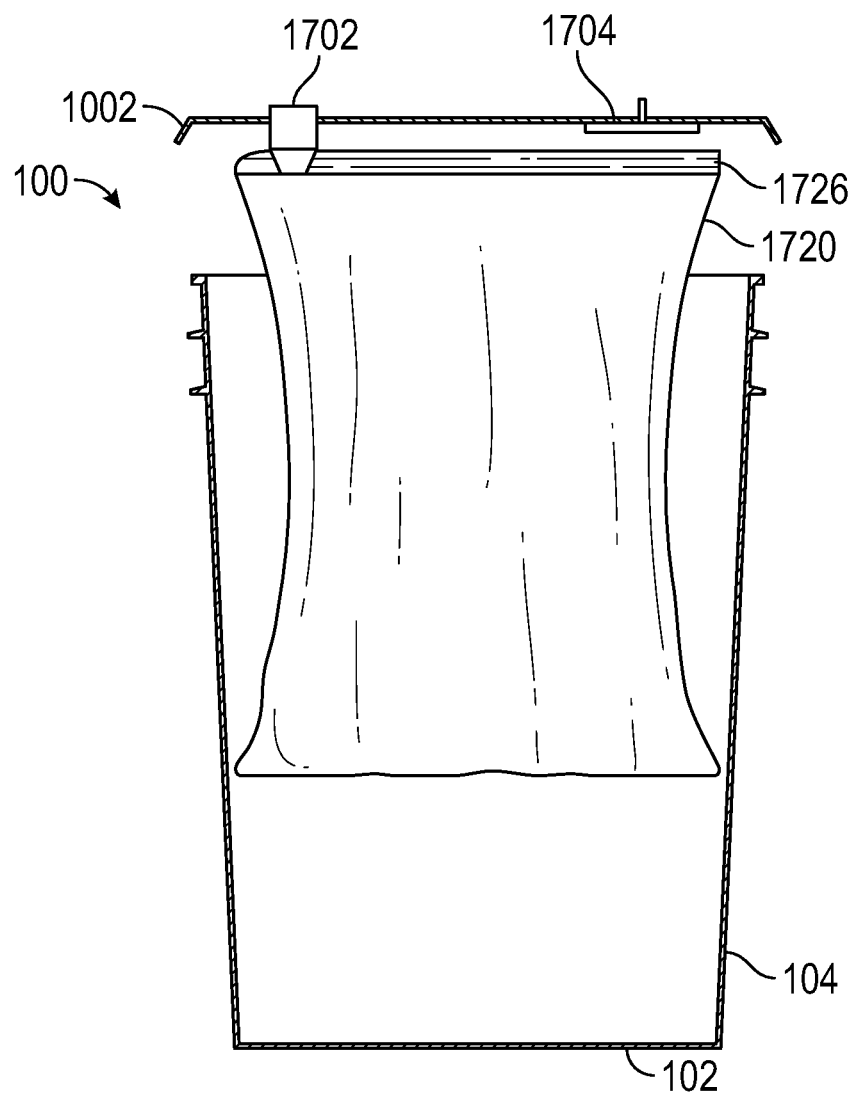
FIG. 17G is a cross-sectional front view of the receptacle with a heat-sealed bag attached to a septum according to some embodiments.

In some embodiments, the bag 1720 can be heat-sealed and disposed within the bucket 100. FIG. 17F is a cross-sectional front view of the receptacle with a heat-sealed bag according to some embodiments. FIG. 17G is a cross-sectional front view of the receptacle with a heat-sealed bag attached to a septum according to some embodiments. The bag 1720 can be at least partially heat-sealed. For example, the bag 1720 can be heat sealed at the top. In some embodiments, the bag 1720 can be heat-sealed on one or more edges and/or on a portion of one or more edges. In some embodiments, other forms of sealing the bag can be used. In some embodiments, a thermoplastic can be heated to create the heat-sealed portion of the bag 1720. In some embodiments, a portion of the bag is melted to join together with another portion of the bag to create the heat-sealed portion of the bag 1720. In some embodiments, heat-sealing is performed by heating and applying pressure to one or more portions of the bag 1720 to create the heat-sealed portion of the bag 1720.

In some embodiments, one or more types of heat-sealing techniques can be used to seal the bag 1720. Hot bar sealers can be used to heat a portion of the bag 1720 at a constant temperature. In some embodiments, continuous heat sealers are used on moving belts over heating elements. In some embodiments, impulse heat sealers are used by applying heat when current flows over the heating element and/or the heating element is placed on the portion of the bag 1720 by pressure. In some embodiments, hot melt adhesive can be applied to the bag 1720, for example, on a corner. In some embodiments, hot wire sealing can be used by applying a heated wire. In some embodiments, induction sealing can be used. In some embodiments, induction welding can be used such as by non-contact induction. In some embodiments, ultrasonic welding can be used such as by using high-frequency ultrasonic acoustic vibrations. In some embodiments, time, temperature, and/or pressure can be adjusted and/or modified to control the heat-sealing. In some embodiments, the heat-sealing of the bag 1720 are to ASTM F88 and/or F2824 standards. In some embodiments, the heat-sealing of the bag 1720 are to ASTM F1140 and/or F2054 standards. In some embodiments, the heat-sealing of the bag 1720 are to ASTM D3078 standards.

Figure 17H:
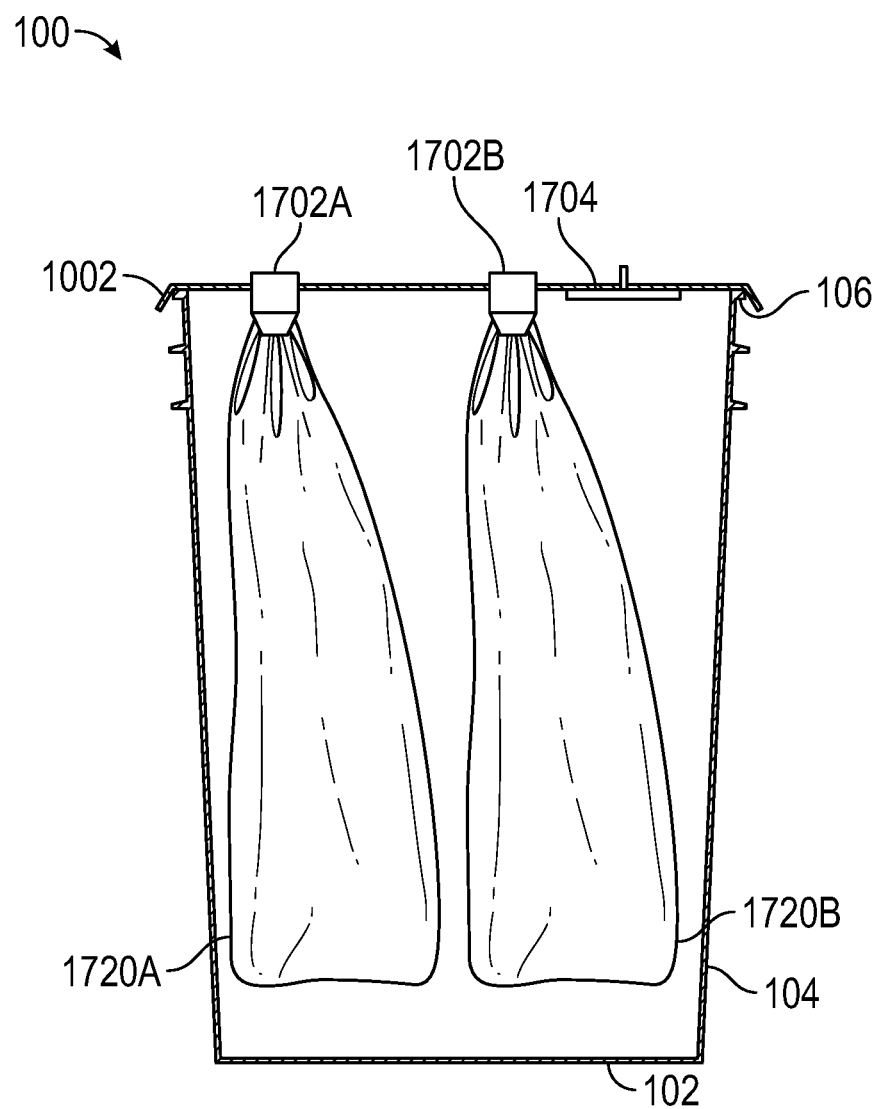
FIG. 17H is a cross-sectional front view of the receptacle with two bags each attached to a septum according to some embodiments.
Figure 17I:
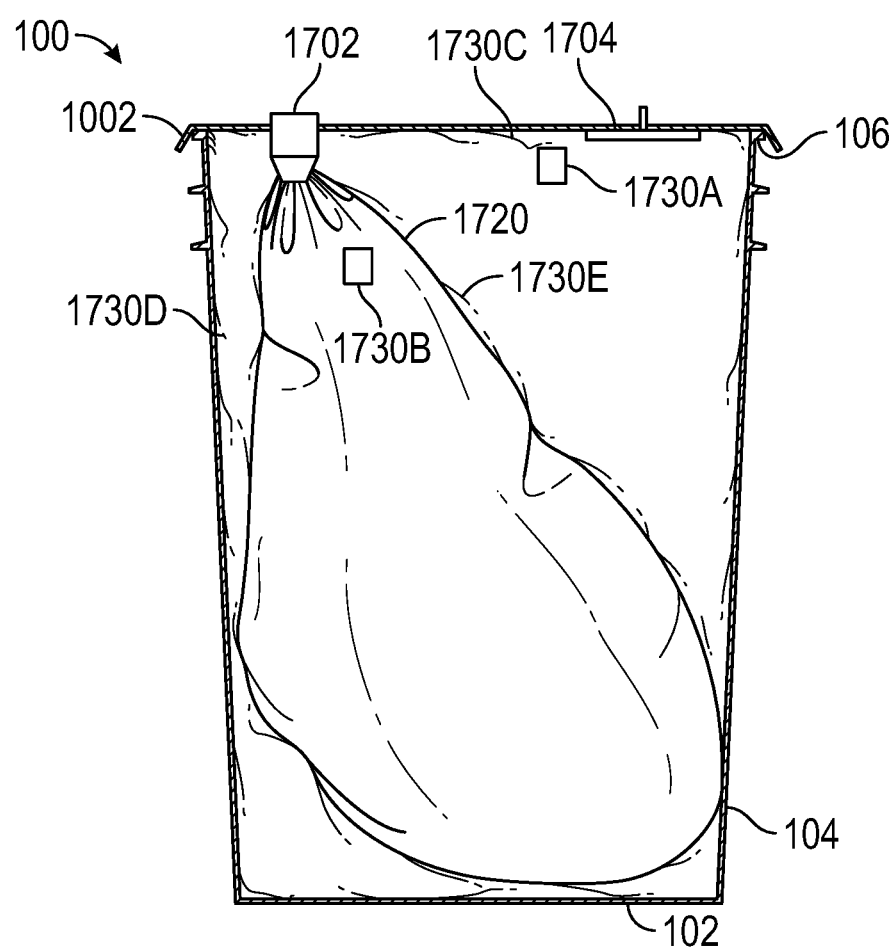
FIG. 17I is a cross-sectional front view of the receptacle with oxygen scavengers and/or the oxygen absorbers according to some embodiments.

In some embodiments, a plurality of bags 1720 can be included within the receptacle 100. FIG. 17H is a cross-sectional front view of the receptacle with two bags each attached to a septum according to some embodiments. Advantageously, during impact and/or storage, the bags 1720 can separate substances. For example, one substance can be placed in a first bag 1720A, and a second substance can be placed in a second bag 1720A. The first bag 1720A can be attached to the first septum 1702A and the second bag 1720B can be attached to the second septum 1702B. During impact of the receptacle 100, the two substances can be separated, whereas if the substances were placed next to and/or on top of each other, during impact, the substances can be in contact and/or combine in certain portions of the substance.

In some embodiments, oxygen scavengers and/or the oxygen absorbers 1730A, 1730B, 1730C, 1730D, 1730E (collectively referred to herein as oxygen scavengers and/or the oxygen absorbers 1730) can be used to reduce oxygen. FIG. 17G is a cross-sectional front view of the receptacle with oxygen scavengers and/or the oxygen absorbers according to some embodiments. In some embodiments, the oxygen scavengers and/or the oxygen absorbers 1730 can work in conjunction with a nitrogen blanket and/or head space purge. The oxygen scavengers and/or the oxygen absorbers 1730 can include polybutylene and/or iron oxide. Advantageously, the oxygen scavengers and/or the oxygen absorbers 1730 can reduce the oxygen within the receptacle 100 for perishable goods. As such, oxidation reactions or the presence of spoilage aerobic microorganisms can be reduced and thus perishable goods deterioration can thus be reduced.

In some embodiments, the oxygen scavengers and/or the oxygen absorbers 1730D can be blended directly into a polymer and/or blended into the injection molding of the receptacle. In some embodiments, the oxygen scavengers and/or the oxygen absorbers 1830 C, 1730D, and 1730E can include an inner layer of co-injection and/or overmolding of the receptacle 100 and/or the lid 1002.

In some embodiments, the oxygen scavengers and/or oxygen absorbers 1730 are applied partially to the receptacle 100, the lid 1002, and/or the bag 1720. Advantageously, Partial application of the oxygen scavengers and/or oxygen absorbers 1730 can improve the gas barrier by lowering the surface to volume ratio of the permeable material.

In some embodiments, the oxygen scavengers and/or the oxygen absorbers 1730 can include absorbers enclosed in a porous sachet and/or packet. The oxygen scavengers and/or oxygen absorbers 1730A can be added to the receptacle 100. In some embodiments, oxygen scavengers and/or oxygen absorbers 1730B can be added to the bag 1720 within the receptacle 100. Advantageously, the time release and/or time absorption requirements of different packaged products can be extended. In some embodiments, the packets 1730A and 1730B can include clay material that can absorb moisture. The clay packets 1730A and 1730B can work in conjunction with the oxygen scavengers and/or the oxygen absorbers 1730C on the lid 1002, the oxygen scavengers and/or the oxygen absorbers 1730D on the receptacle 100, and/or the oxygen scavengers and/or the oxygen absorbers 1730E on the bag 1720. The clay packets 1730A and 1730B can also work in conjunction with a nitrogen blanket and/or head space purge. The clay packets 1730A and 1730B can include iron oxide. The clay packets 1730A and 1730B can be packaged into a plastic material with a higher permeability than the receptacle 100 such that the discharge from the clay packets 1730A and 1730B can only have a slightly higher absorption rate than the receptacle 100.

The term "indent" as used herein, is a broad term encompassing its plain and ordinary meaning, and, as used in reference to an article that conveys information to the consumer/user. The indent can be of a variety of different shapes and sizes, can be a recess, a pocket, a thinner wall thickness area.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being redefined herein to be restricted to including any specific characteristics of the features or aspects of the invention with which that terminology is associated. The scope of the invention should therefore be construed in accordance with the appended claims and any equivalents thereof.

What is claimed is:

1. A receptacle with a lid including a septum to inject gas or flush headspace, the receptacle comprising:
    a bottom portion;
    a side wall portion, wherein the side wall portion is attached to the bottom portion;
    a top portion comprising an opening to allow items to be placed inside the receptacle, wherein the top portion is attached to the side wall portion;
    the lid, wherein the septum is installed or molded into the lid to inject gas and/or flush headspace; and
    one or more stacking lugs, wherein the stacking lugs reduce vacuum or friction when receptacles are de-nesting, wherein the stacking lugs are disposed on the side wall portion of the receptacle.

2. The receptacle of claim 1, wherein one or more surfaces of the receptacle is treated or coated with gas barrier materials.

3. The receptacle of claim 2, wherein the one or more surfaces have been plasma treated to enhance gas barrier properties.

4. The receptacle of claim 2, wherein the one or more surfaces have been treated or coated with at least one of: EVOH, PHAE, MXD-6 nylon, and LCP.

5. The receptacle of claim 2, wherein the receptacle is produced by co-injection technology to incorporate gas barrier materials in as a multi-layer structure.

6. The receptacle of claim 1, wherein the septum or the receptacle is installed or molded into the lid to inject gas or flush headspace.

7. The receptacle of claim 1, wherein the lid is a seat for a user.

8. The receptacle of claim 1, wherein the receptacle is produced by at least one of: recycled polypropylene feedstocks, clarified polypropylene, impact resistant modified polypropylene, plant based polymers, or high density polyethylene.

9. The receptacle of claim 1, wherein the receptacle is produced by co-injection technology to incorporate recycle feedstock in as a multi-layer structure.

10. The receptacle of claim 1, wherein the side wall portion contains an indent.

11. A receptacle with a bag including a septum to inject gas or flush headspace, the receptacle comprising:
    a bottom portion;

a side wall portion, wherein the side wall portion is attached to the bottom portion;

a top portion comprising an opening to allow items to be placed inside the receptacle, wherein the top portion is attached to the side wall portion; and the bag displaced within the receptacle as a liner, wherein the septum is installed or molded on the bag to inject gas and/or flush headspace.

12. The receptacle of claim 11, wherein the septum comprises a screw or a top.

13. The receptacle of claim 11, wherein the septum is configured to purge headspace in a closure of the bag.

14. The receptacle of claim 11, wherein the bag is configured to provide a gas barrier.

15. A receptacle with a closure including a septum, the receptacle comprising:

a bottom portion;

a side wall portion, wherein the side wall portion is attached to the bottom portion;

a top portion comprising an opening to allow items to be placed inside the receptacle, wherein the top portion is attached to the side wall portion;

the closure, wherein the closure is attached to a lid and comprises the septum that is disposed on the closure to enable intake and/or outtake of material from within the receptacle; and one or more stacking lugs, wherein the stacking lugs reduce vacuum or friction when receptacles are de-nesting, wherein the stacking lugs are disposed on the side wall portion of the receptacle.

16. The receptacle of claim 15, wherein the closure is configured to snap fit onto the receptacle.

17. The receptacle of claim 15, wherein the septum is installed or molded onto the closure to enable purging of headspace.

18. The receptacle of claim 15, wherein the closure is a liner to the receptacle.

* * * * *